Sept. 23, 1952            E. E. HANS            2,611,544

HEATING ARRANGEMENT FOR CLOSED AUTOMOTIVE BODIES

Filed Sept. 24, 1949            2 SHEETS—SHEET 1

INVENTOR.
Edmund E. Hans.
BY
*Graw f Baldwin*
Attorney.

Sept. 23, 1952 E. E. HANS 2,611,544
HEATING ARRANGEMENT FOR CLOSED AUTOMOTIVE BODIES
Filed Sept. 24, 1949 2 SHEETS—SHEET 2
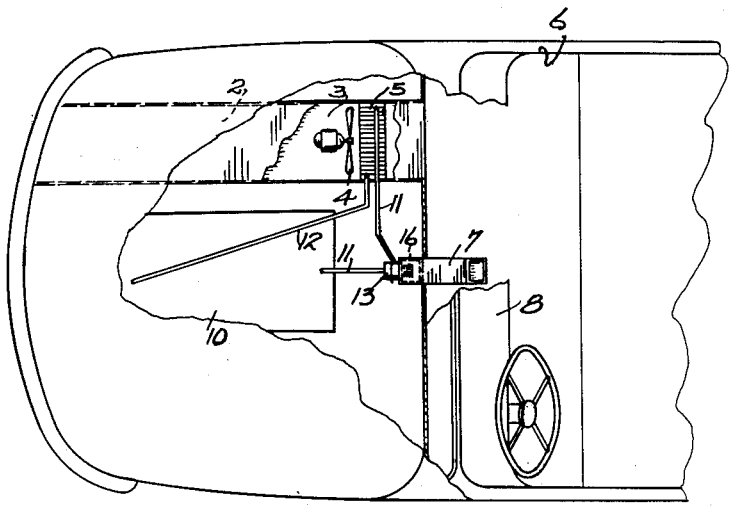
Fig. 4
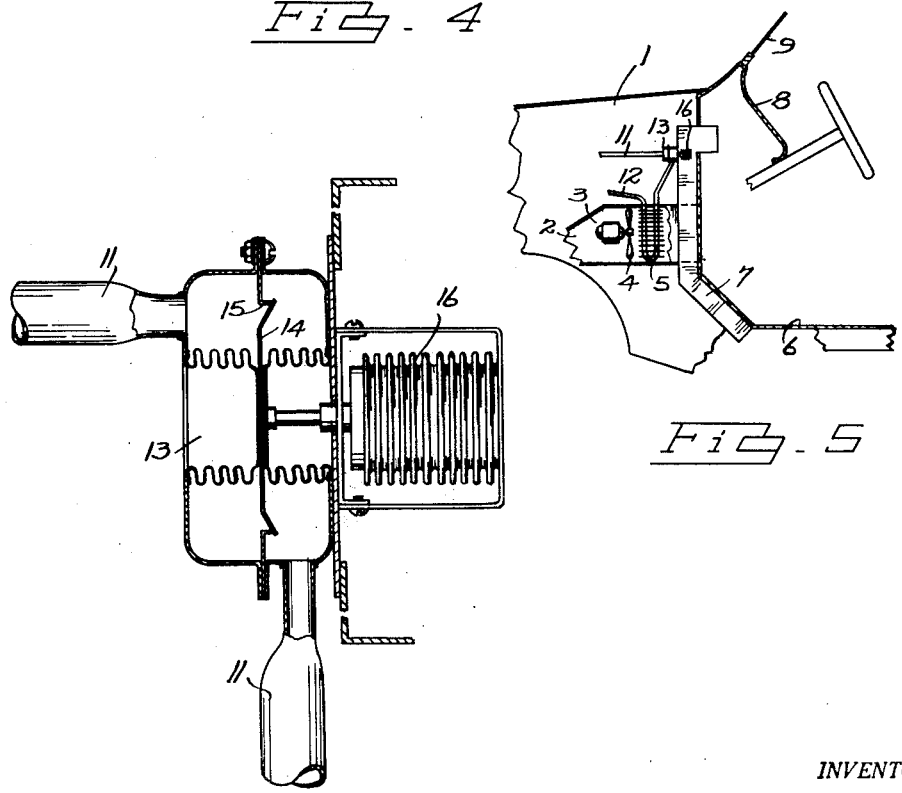
Fig. 5
Fig. 6
INVENTOR.
Edmund E. Hans.
BY
Graw J Baldwin
Attorney.

Patented Sept. 23, 1952

2,611,544

UNITED STATES PATENT OFFICE 2,611,544

HEATING ARRANGEMENT FOR CLOSED AUTOMOTIVE BODIES

Edmund E. Hans, Detroit, Mich.

Application September 24, 1949, Serial No. 117,575

2 Claims. (Cl. 237—12.3)

This invention relates to improvements in heating arrangements for closed automotive bodies. In the past it has been customary to rely upon leakage around doors and windows of a closed automotive body for the escape of sufficient air from within the body to permit entry of fresh heated air discharged thereinto by a heater without increasing the air pressure within the body. However now, both because modern automotive bodies are being made tighter, and because modern heaters discharge a greater volume of air, it is necessary to provide for free outlet of air from within the body in order that the full output of the heater may be admitted, for obviously a heater will not deliver its maximum output if in so doing it builds up air pressure within the body, and furthermore increased pressure therein is not desirable.

It is, therefore, an object of this invention to provide a simple and effective heating arrangement for closed automotive bodies including means for permitting free escape of air from within the body as fresh air is discharged thereinto. Moreover the arrangement is such that the fresh heated air follows a prescribed course before reaching the outlet so that the entire air content of the body is being constantly changed.

Another object of the invention is to provide a heating arrangement for closed automotive bodies including a heater core through which hot water is circulated from the engine cooling system, a fan for discharging fresh air from outside through the heater core into the body, and means controlled by the temperature of air escaping from within the body for regulating the flow of hot water from the cooling system through the heater core, so that a substantially uniform temperature is maintained at all times within the body.

Having stated some of the objects and advantages of the invention I will now describe a preferred embodiment thereof with the aid of the accompanying drawings, in which:

Figure 4 is a partial plan view, also enlarged, with parts broken away.

Figure 5 is a side view showing a slight modification, and

Figure 6 is an enlarged view showing a thermostatic valve connected to the water inlet pipe to the heater core.

Figure 1:
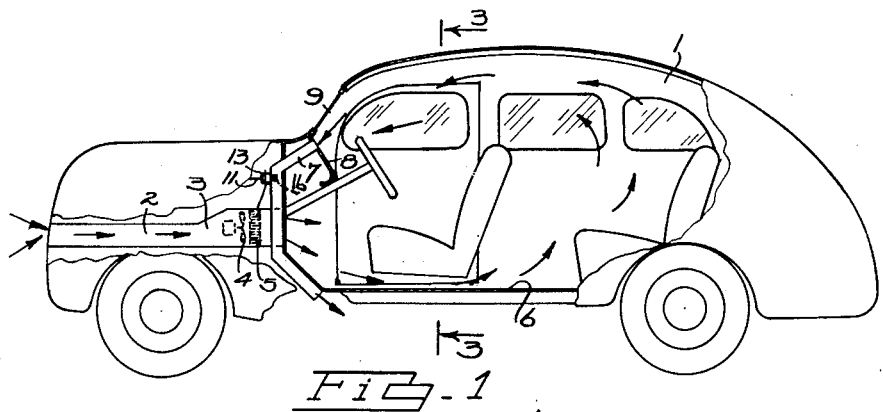
Figure 1 shows a side of an automobile, partly in section, equipped with the invention.

Referring to the drawings, 1 designates a closed automotive body having a heater 2 therein including an air duct 3 through which fresh air from outside is discharged into the body. Mounted in the duct 3 is a fan 4 by which the air is discharged into the body 1 through a heater core 5. In the present instance the duct 3 is shown entering the body at the front of the latter just above the floor 6, so that the air discharged by the fan flows rearwardly in the body at a low elevation therein, rises adjacent the back of the body and returns toward the front at a higher elevation.

Figure 2:
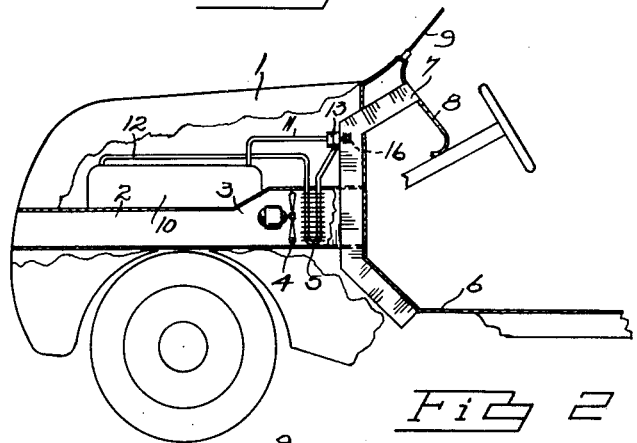
Figure 2 is a partial side view on a larger scale.
Figure 3:
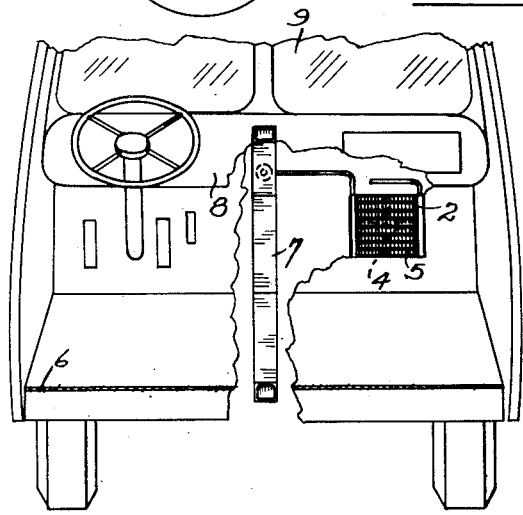
Figure 3 is a partial section on the line 3—3 of Figure 1, also on an enlarged scale.

Mounted in the body 1 is an air outlet pipe 7 which, in the present instance, is substantially vertically arranged in the front thereof with its lower extremity, which is open, projecting downwardly through the floor 6. The upper extremity of the outlet pipe 7 may extend through the instrument board 8 and terminate flush with the upper face of the latter as shown in Figures 1 and 2, so that air which flows forward in the body at a higher elevation therein will pass downwardly to the outlet pipe adjacent the windshield 9. Or, if desired, the air outlet pipe 7 may be otherwise located, for instance its inlet end may be positioned beneath and in front of the instrument board 8 as shown in Figure 5.

A flow pipe 11 and a return pipe 12 are each connected both to the water cooling system of the motor 10 and to the heater core 5, so that water from the former may circulate through the latter. Provided in the flow pipe 11 intermediately of its length is a thermostatic valve 13 of known design, having a valve member 14 therein adapted to be moved toward or from its seat 15 by a heat responsive element 16 mounted in the air outlet pipe 7. Thus as the temperature of the air escaping from within the body 1 through the outlet pipe varies it adjusts the amount of water passing through the flow pipe 11, and consequently the temperature of the fresh air as it leaves the heater core 5 on its way into the body 1.

From the foregoing it will be clearly seen not only that fresh air from the heater 2 is constantly being discharged into the body 1 through the duct 3 so that this fresh air follows a prescribed course and then escapes through the air outlet pipe 7, but also that the temperature of the air escaping through the said outlet pipe controls the flow of hot water through the heater core 5 so that a uniform temperature is maintained in the body at all times.

What I claim is:

1. A heating arrangement for closed vehicle bodies including a closed body, a substantially horizontal air inlet duct in the hood of said body open at one extremity to the outside at the front of said hood and at the other extremity into the front of the body adjacent the floor, heating means in the duct, means in the duct for forcing air from outside through the heating means and rearwardly in the body adjacent the floor whereby air rises at the back of the body and returns at a higher elevation toward the front where it flows downwardly, an air outlet pipe arranged adjacent said heating means, said pipe being open at one extremity within the body above the point of discharge of the air from the duct into said body and being open at its other extremity outside of the body below the aforesaid point of discharge whereby upon completion of its flow pattern air is exhausted through said outlet pipe at the front of the body.

2. A heating arrangement for closed vehicle bodies including a closed body, a substantially horizontal air inlet duct in the hood of said body open at one extremity to the outside at the front of said hood and at the other extremity into the front of the body adjacent the floor, heating means in the duct, means in the duct for forcing air from outside through the heating means and rearwardly in the body adjacent the floor whereby air rises at the back of the body and returns at a higher elevation toward the front where it flows downwardly, an air outlet pipe arranged adjacent said heating means, said pipe being open at one extremity within the body and above and rearwardly of the point of discharge of the air from the duct into said body and being open at its other extremity outside of the body below and rearwardly of the aforesaid point of discharge whereby upon completion of its flow pattern a suction is created and air is exhausted through said outlet pipe at the front of the body.

EDMUND E. HANS.

REFERENCES CITED

The following references are of record in the file of this patent:

UNITED STATES PATENTS

| Number | Name | Date |
| --- | --- | --- |
| 1,762,465 | Bovey | June 10, 1930 |
| 1,792,191 | Smith | Feb. 10, 1931 |
| 2,158,741 | Christman | May 16, 1939 |
| 2,203,477 | Wahlberg | June 4, 1940 |
| 2,476,295 | Hans | July 19, 1949 |

FOREIGN PATENTS

| Number | Country | Date |
| --- | --- | --- |
| 692,878 | Germany | June 28, 1940 |